United States Patent Office 3,481,418
Patented Dec. 2, 1969

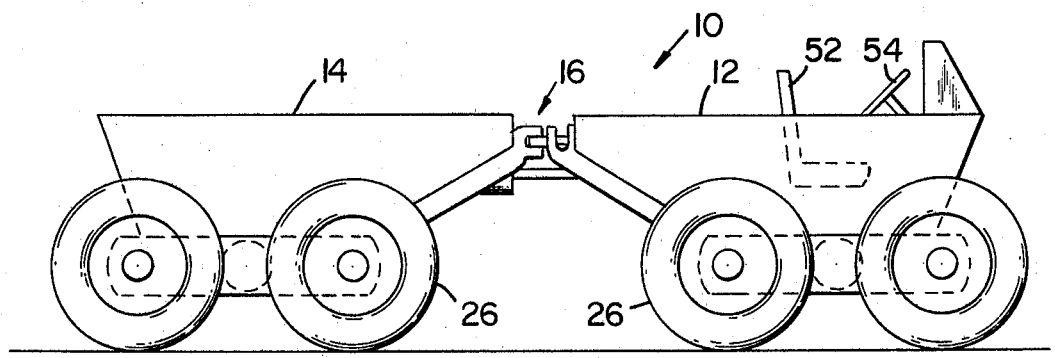
FIG_1
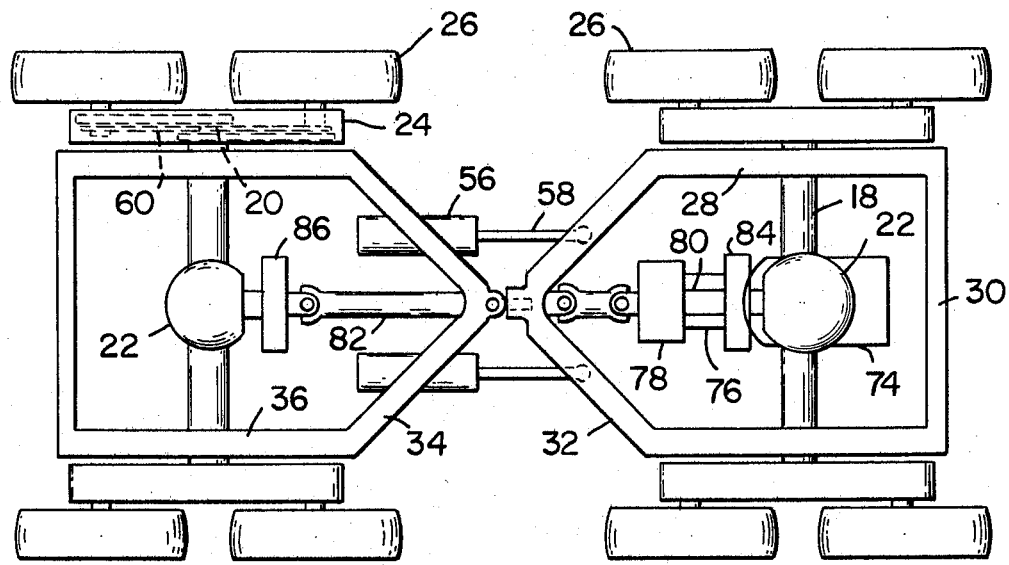
FIG_2
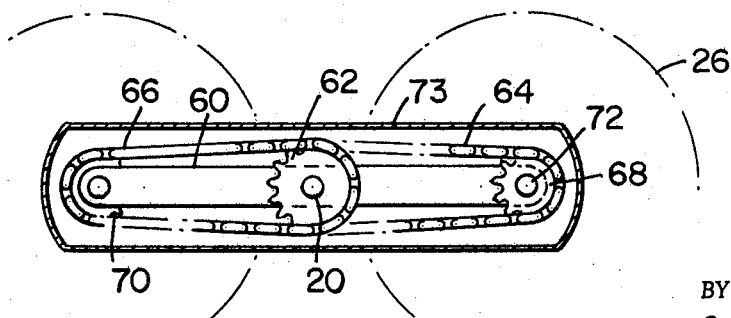
FIG_3
INVENTOR.
KENNETH R. WALLAN

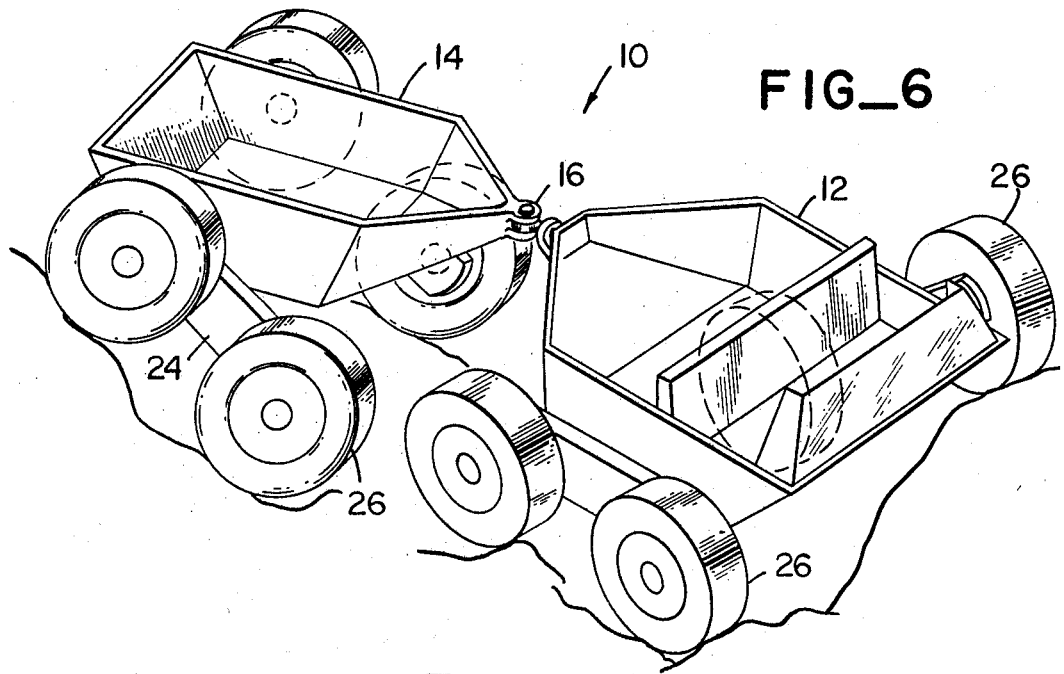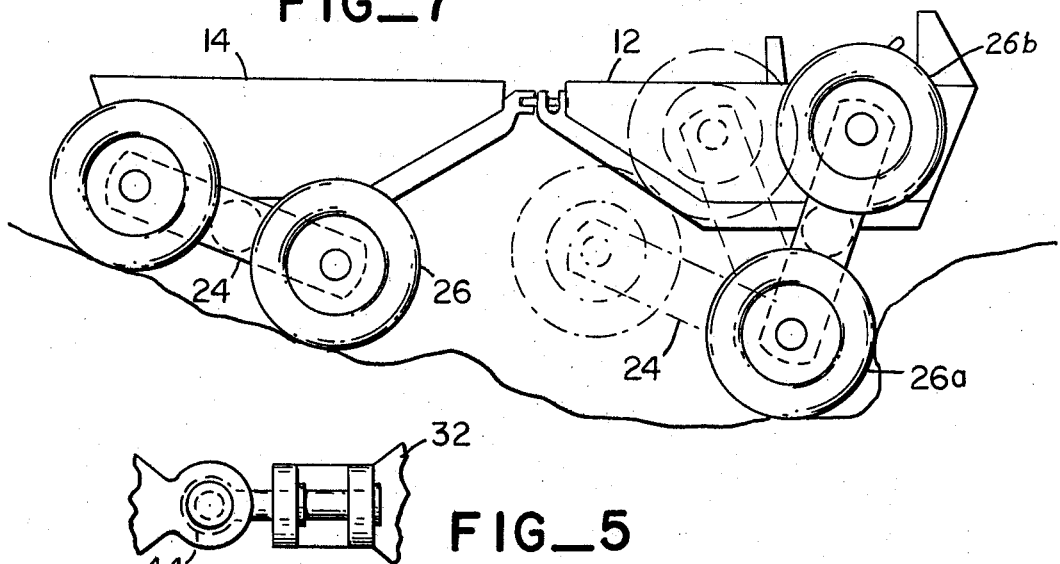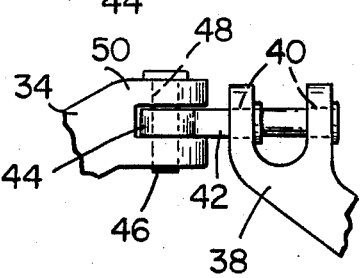

3,481,418
ARTICULATED VEHICLES WITH INDIVIDUAL
AXLE REVERSING DRIVE MECHANISMS
Kenneth R. Wallan, P.O. Box 245,
Miranda, Calif. 95553
Filed May 15, 1967, Ser. No. 638,521
Int. Cl. B62d 61/00, 7/00
U.S. Cl. 180—23         4 Claims

ABSTRACT OF THE DISCLOSURE

A wheel type off-roadway vehicle for traversing rough terrain comprises a pair of body sections which are connected together so that they can turn and twist relative to each other. Each body section is supported by an axle and at both ends of each axle is a completely rotatable walking beam on which are mounted a pair of wheels. When one wheel on a walking beam hits an obstruction and is stopped as the vehicle is moved forward, the walking beam is caused to rotate on the axle to bring the other wheel around and place it forwardly from the stopped wheel, thereby enabling the vehicle to overcome the obstruction.

---

This invention relates generally to self-propelled land vehicles and more particularly to a vehicle for use in traversing rough terrain because of a unique capability for overcoming natural or man-made obstacles such as gulleys, large boulders, fallen trees and the like.

My vehicle is extremely useful wherever it is advantageous or necessary to traverse rough terrain having obstacles of various types that would not be encountered on a normal roadway. For example, it may be used in one form as a military vehicle for carrying men and supplies or for exploratory purposes over rough terrain on this or other planets.

A use for which my vehicle is particularly adaptable is that of traversing rough forest terrain either before or after logging operations have taken place. One reason for this is that my invention solved the problem of moving a rubber-tired vehicle easily over obstacles such as ditches, stumps, boulders or logs. This ability to overcome such obstacles is made possible at least in part by an arrangement of cooperating structural features which includes a pair of body sections connected by a pivotal type of joint so each section can twist and pivot to a considerable degree relative to the other section. Each body section is supported by a unique walking beam which is independently rotatable about an axle. The walking beam in each case supports a pair of rubber-tired wheels to which a driving torque is transmitted through a suitable mechanism in the walking beam. Thus, as the vehicle is propelled forwardly, both wheels of each walking beam will be in normal driving engagement with the ground until an obstacle is reached. If one of the front wheels of a walking beam should encounter an obstacle such as a log or the edge of a ditch or crater and is caused to remain stationary, the driving force of the other vehicle wheels moves the vehicle ahead and the walking beam is forced to pivot about the stopped front wheel. This temporarily obstructed walking beam thus rotates until its second wheel comes around and engages the ground or the obstacle forwardly of the stopped wheel, thereby moving the vehicle ahead and freeing the stopped wheel from its obstacle. If both of the front wheels of either body section are simultaneously impeded by an obstacle, a gear box connected to the driving axles of that body section can either be placed in neutral to allow both walking beams of that body section to be rotated by the force of the other wheels, or they can be reversed so that the walking beams can be helped to rotate and advance the vehicle over the obstacle.

It is therefore a general object of my invention to provide a vehicle capable of traversing rough terrain and more specifically one which can climb over obstacles such as logs, stumps, ditches and the like, which would stop conventional vehicles including even those having continuous tracks.

A more specific object of the present invention is to provide a vehicle for rough terrain wherein a pivotal connection between two body sections cooperates with the independent rotary motion of walking beam units on the axles of both sections to allow the vehicle to twist and turn as required as it moves forwardly over various obstacles.

Another object of the present invention is to provide a vehicle having two pivotally connected body sections each with an axle supporting a pair of walking beams at the ends thereof, with each beam having a pair of driving wheels, and reversing means on each body section so that the driving direction of the wheels on one body section can be changed when necessary relative to the driving direction of the wheels on the other section in order to maneuver the vehicle over various forms of obstacles.

Yet another object of my invention is to provide a vehicle that is strong and rugged as well as being easy to operate and maintain.

Still another object of the present invention is to provide a vehicle that is particularly well adapted for ease and economy of manufacture.

Other objects, advantages and features of my invention will become apparent from the following detailed description of one embodiment thereof presented in accordance with 35 U.S.C. 112.

In the drawing:
FIG. 1 is a view in elevation showing a vehicle embodying the principles of the present invention;
FIG. 2 is a bottom plan view of the vehicle of FIG. 1 showing its undersides;
FIG. 3 is an enlarged fragmentary view in elevation and in section showing internal details of a walking beam for the vehicle of FIGS. 1 and 2;
FIG. 4 is an enlarged fragmentary view in elevation showing the connecting joint for the body sections of my vehicle;
FIG. 5 is a plan view of the connecting joint shown in FIG. 4;
FIG. 6 is an end view of the vehicle according to my invention;
FIG. 7 is a view in side elevation showing my vehicle as it appears when overcoming an obstacle, the various positions of the wheels on a front walking beam being shown in phantom.

Referring to the drawing, FIGS. 1 and 2 show a vehicle 10 embodying the principles of the present invention which is capable of traversing rough terrain and climbing over various obstacles that would normally prevent the forward progress of conventional vehicles. It is to be understood that the vehicle is illustrated in more or less schematic form and the scope of the invention is not intended to be limited by nonessential details of construction or by any assumed lack of same. In general, my vehicle comprises a pair of body sections 12 and 14 which are connected together by a form of universal joint 16 that allows the body sections to twist angularly relative to each other about a longitudinal axis and also to pivot relative to each other about a vertical axis.

Fixed to each of the body sections is a housing 18 supporting a pair of driving axles 20 that extend from a differential gear box 22. Attached to both ends of each axle 20 is a walking beam assembly 24. In accordance with the principles of my invention, each walking beam assembly supports a pair of wheels 26 and is free to rotate about an axis midway between the wheels when acted upon by an unbalanced force applied to either of them. The wheels are shown as having large rubber tires, but they may be of any suitable type that is particularly adaptable to the terrain on which the vehicle is to be used. And, in some instances, the wheels may be drivingly connected to a surrounding flexible track member with either hard rubber or metal cleats (not shown).

The frame of each body section may be constructed from structural metal members in any desired configuration. Generally, the front section 12 comprises a pair of side members 28 connected by a transverse front member 30. A pair of converging frame members 32 extend rearwardly and upwardly from the side members on the front frame section 12 and meet at the universal joint 16. Similarly, on the rear body section 14 another pair of converging frame members 34 extend forwardly and upwardly from a pair of side frame members 36 to meet and connect to the universal joint 16.

The universal joint may be of any suitable design which affords the desired two degrees of freedom between the front and rear body sections. For example, as shown in FIGS. 4 and 5, a first bifurcated fitting 38 with a pair of vertical bearings 40 having aligned horizontal axes is fixed to the rear end of the frame of the front body 12. It retains one end of an axially extending pin 42 which is connected by an eye portion 44 at its other end to a vertical pin 46. The latter is retained by a pair of bearing members 48 of a bifurcated frame portion 50 on the front end of the rear body 14. As shown, the universal fitting 16 is located well above the wheels and lower portions of the body sections 12 and 14 so that its movable components are free to operate properly and are well protected from engagement with any obstacles which the vehicle may travel over. This universal joint connection between the two body sections allows them to twist and turn freely with respect to each other within angular limits that are defined by suitable stop members, not shown.

The front and rear body sections may have various configurations and can be made to support any desired type of carrying bed, cab or housing depending on the particular use to which the vehicle will be put. The front body is a preferred location for a driver's station which, as shown in FIG. 1, would include a seat 52 and controls 54 for the vehicle.

The steering for the vehicle is accomplished by turning the front body section 12 relative to the rear section 14 about the vertical axis provided by the universal joint 16. In the arrangement shown, a pair of hydraulic actuators 56 are pivotally connected at one end to the rear body section, and their actuator rams 58 are pivotally connected to the converging frame members 32 of the forward body section. The suitable hydraulic system may be provided for controlling fluid pressure in the actuators and thus the steering operation, and since such a hydraulic control system may be conventional in every respect it is not shown in detail. Other means may also be utilized for steering the vehicle within the scope of the invention.

To propel my vehicle, controllable torque is supplied through each axle 20 to the wheels 26 on each walking beam assembly 24 by means of a suitable mechanical connection. In the arrangement shown in FIG. 3, a direct chain drive is utilized for each walking beam drive system. Here, the walking beam assembly includes a transverse bar 60 attached to the axle 20 at its center. A pair of sprockets 62 are spaced apart on opposite sides of the bar 60 and are fixed to the axle near the end thereof. A pair of chains 64 and 66 extend around the sprockets 62 and around another pair of sprockets 68 and 70 which are fixed to a shaft 72 for each wheel 26. These latter shafts are spaced an equal distance from the axle 20 and are rotatably supported in the bar 60 walking beam. The walking beam or bar 60 including the aforesaid sprockets and chains are preferably enclosed in a housing 73.

A suitable power plant, such as an internal combustion engine, may be used to provide the necessary torque to each axle and both are preferably driven through differential gear boxes 22 on the front and rear body sections. In the embodiment shown in FIG. 2 a suitable power source such as an internal combustion engine 74 is connected to a main transmission 76 which is connected to a suitable transfer case or clutching mechanism 78. From the latter a pair of drive shafts 80 and 82 extend forwardly and rearwardly to the differential gear boxes 22. A pair of reversing gear boxes 84 and 86 are provided, one for each body section between the transfer case 78 and the differential gear box 22 for that section. This enables both sets of wheels on one main axle 20 to be turned in a direction opposite to the wheels on the other main axle when necessary. This arrangement provides a means for increasing the maneuvering capabilities of the vehicle when it encounters certain obstacles and in situations where a reversing force applied to one body section is particularly effective, as will be explained below.

The unique articulation of my vehicle which affords its versatility of operation is illustrated at least in part in FIGS. 6 and 7. As the vehicle is operating, the power applied to the sets of wheels causes each to contribute a separate motive effort in the direction of travel which under normal operation is cumulative. As lateral variations in the terrain level are encountered, the front and rear body sections can twist and turn relative to each other at the universal joint 16. When an obstacle having a substantial height such as a wall of a ditch is encountered, as shown in FIG. 7, the action taken by the vehicle to surmount the obstacle depends on whether the wheels on one or both of the walking beams engages the obstruction. If the front wheel 26a on one walking beam is first to engage the obstruction and is held stationary by it, the driving force of the other vehicle wheels on the rear body section 14 continues to push the vehicle forward, the captive front wheel becomes a fulcrum for its walking beam assembly 24 which is thus caused to rotate about its main axle 20. Thus, the free rear 26b wheel on this walking beam rotates around and advances forward of the captive wheel thereby allowing the vehicle to continue moving forward. The action will take place whether or not a log, boulder, ditch or any obstacle is encountered.

If the front wheels of both walking beams of a body section simultaneously engage an obstacle and cannot go over it with the wheels turning normally and are thereby stopped, the reverse gear 84 or 86 of that body section is actuated to either put the blocked wheels in neutral or to reverse their driving direction. If placed in neutral the walking beams are free to rotate about their axles with the forward driving force being supplied by the rear wheels. If the driving direction of the front wheels is reversed, then the walking beams are in effect drivingly rotated about their axles to overcome the obstacle and this rotation can be continued as long as necessary. By actuating the driving wheels in any number of different combinations almost any obstacle situation can be overcome to enable the vehicle to move forward.

An advantageous characteristic of my vehicle arises from the fact that the body sections remain relatively stable and level during the rotating of the walking beams. This eliminates the need for a complicated heavy spring suspension, and allows the body sections to ride close to the ground while still providing for a reasonably smooth ride over rough terrain.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

I claim:
1. A vehicle for traversing rough terrain, comprising:
a pair of body sections;
means for connecting said body sections so that they can twist relative to each other about a longitudinal axis and turn relative to each other about a vertical axis;
axle means on each said body section extending transversely to its longitudinal axis;
a walking beam assembly rotatably attached to the end of each said axle means and including a pair of spaced apart wheels and means connected to said axle means for driving said wheels;
a power means;
a differential gear means in each said body section connected to a said axle means;
and means including a controllable reversing gear in each body section interconnecting said power means with a said differential gear means in the same body section;
whereby said power means can be activated for driving all of said wheels on both of said walking beams in the same direction or alternatively for driving the wheels on one body section in a direction opposite to those on the other body section.

2. The vehicle as described in claim 1 wherein said means connected to each said axle means for driving its wheels comprises a pair of sprockets fixed to the axle means, said walking beam assembly comprising a transverse bar rotatably attached to the axle means and supporting a pair of spaced apart shafts for said wheels, a separate sprocket on each said shaft, and a pair of continuous chains interconnecting the sprockets on the axle means and the sprockets on said wheel shafts.

3. The vehicle as described in claim 1 including steering means for moving one body section about said vertical axis relative to the other body section.

4. A vehicle for traversing rough terrain, comprising:
a pair of body sections;
means for connecting said body sections so that they can twist relative to each other about a longitudinal axis and turn relative to each other about a vertical axis;
axle means on each said body section extending transversely to its longitudinal axis;
a walking beam assembly rotatably attached to the end of each said axle means including at least two spaced apart wheels rotatably mounted on said walking beam assembly, and means connected to said axle means for driving said wheels;
a power means;
a differential gear means in each said body section connected to a said axle means;
means for interconnecting said power means with each said differential gear means;
and a controllable reversing means in each body section connected to each said differential gear means;
whereby said power means can be activated for driving all of said wheels on both of said walking beams in the same direction or alternatively for driving the wheels on one body section in a direction opposite to those on the other body section.

References Cited

UNITED STATES PATENTS

| | | |
|---|---|---|
| 2,219,533 | 10/1940 | Ross. |
| 3,057,319 | 10/1962 | Wagner. |
| 3,157,239 | 11/1964 | Bernotas _ _ _ _ _ _ _ _ _ _ _ _ 180—51 |
| 3,208,544 | 9/1965 | Colvin _ _ _ _ _ _ _ _ _ _ _ _ _ _ 180—51 |
| 3,349,863 | 10/1967 | Wagner _ _ _ _ _ _ _ _ _ _ _ 180—51 X |

FOREIGN PATENTS 840,263   7/1960   Great Britain.

A. HARRY LEVY, Primary Examiner

U.S. Cl. X.R.

180—51